Oct. 31, 1933.  C. E. DUFFIELD  1,933,420
WRIST PIN SHOCK ABSORBER
Filed Aug. 15, 1928  3 Sheets-Sheet 1
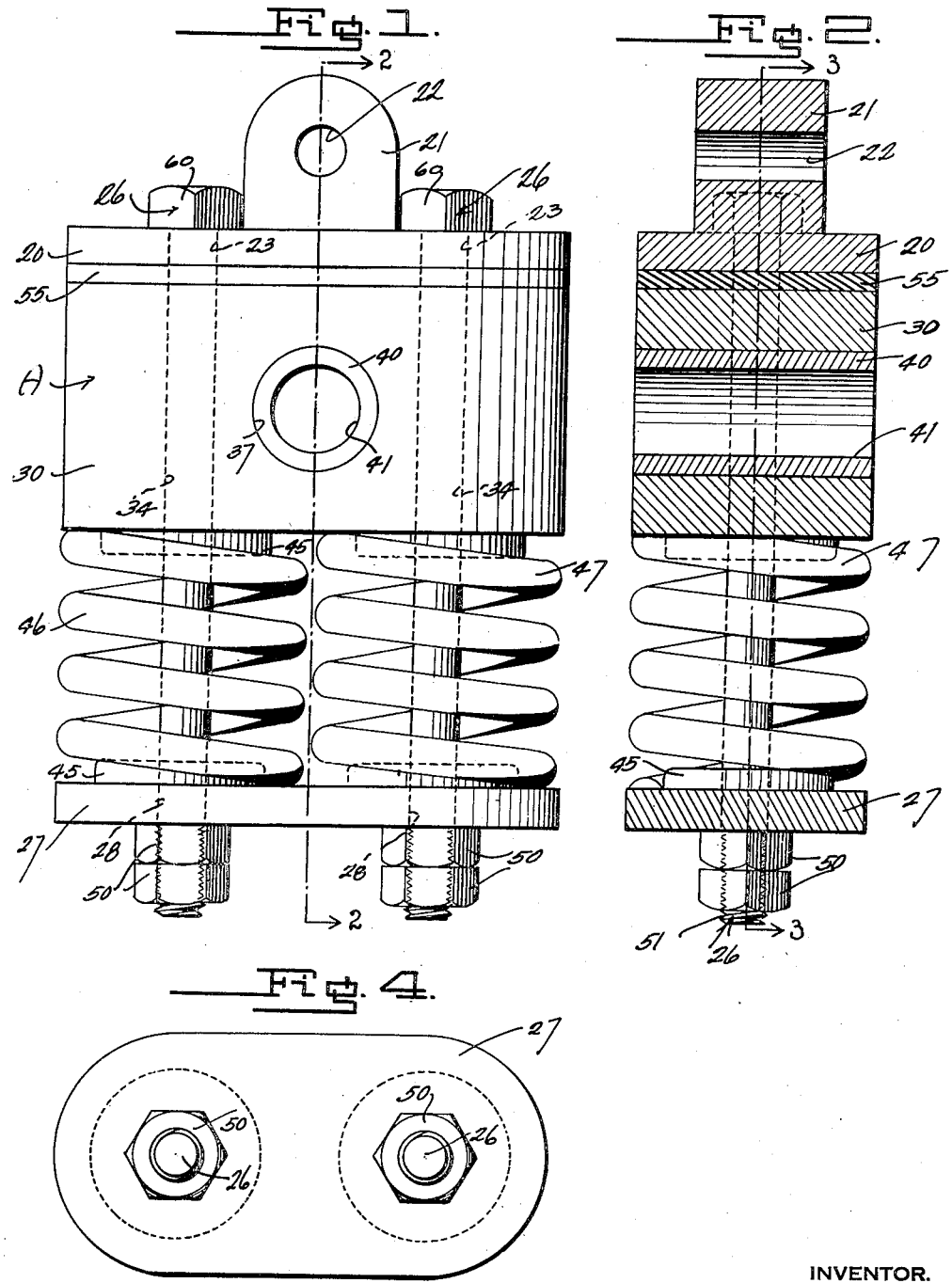
INVENTOR.
Carl E. Duffield
BY
ATTORNEYS.

Oct. 31, 1933.   C. E. DUFFIELD   1,933,420
WRIST PIN SHOCK ABSORBER
Filed Aug. 15, 1928   3 Sheets-Sheet 2
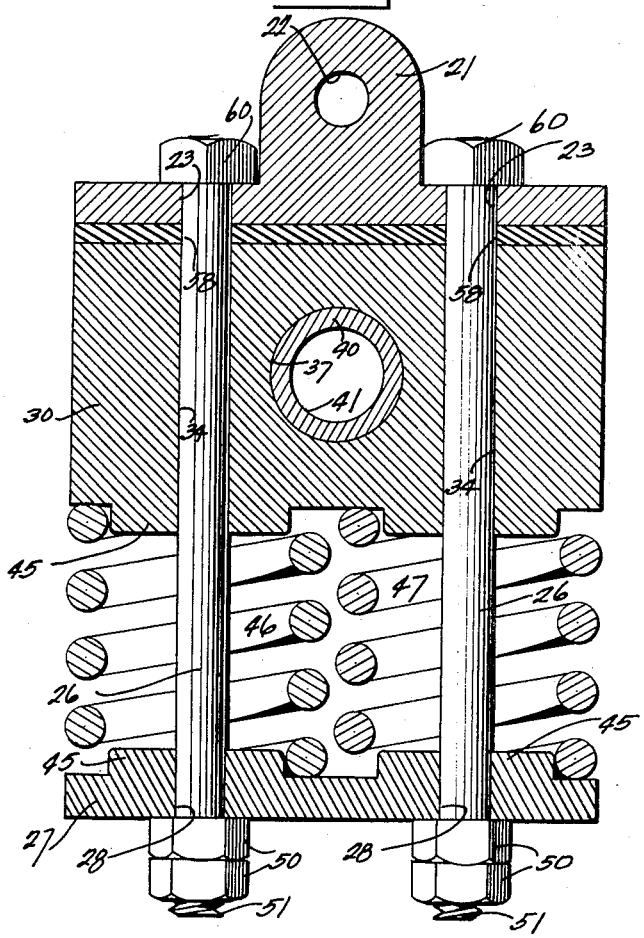
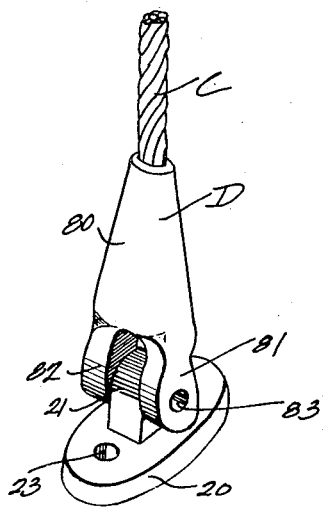
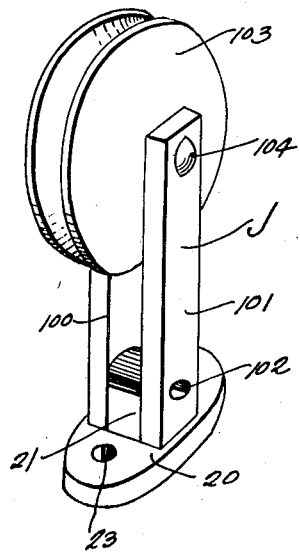
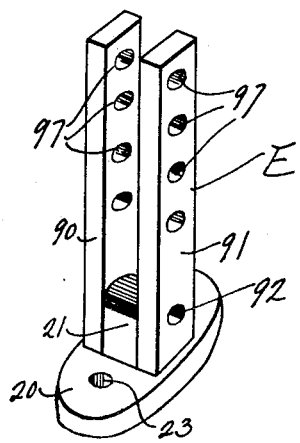
INVENTOR.
Carl E. Duffield
BY Lancaster and Allwine
ATTORNEYS.

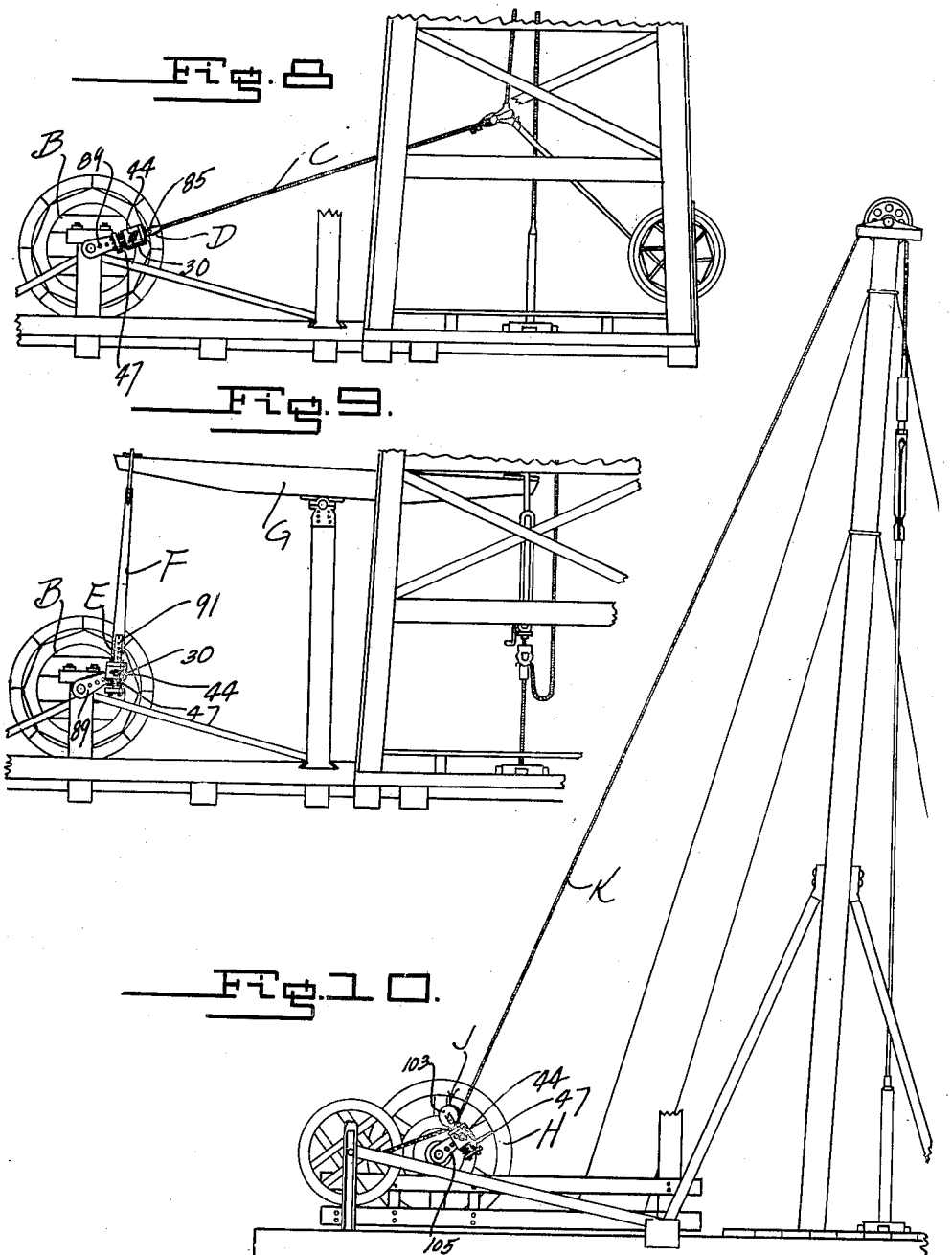

Patented Oct. 31, 1933

1,933,420

UNITED STATES PATENT OFFICE 1,933,420

WRIST PIN SHOCK ABSORBER

Carl E. Duffield, Tulsa, Okla.

Application August 15, 1928. Serial No. 299,838

1 Claim. (Cl. 308—26)

This invention relates to improvements in shock absorbing means for use in connection with well drilling and spudding apparatus.

The primary object of this invention is the provision of improved means for resiliently buffing the shock, at the wrist pin connection between drilling equipment and other well drilling and spudding parts, by means of which shock upon rigs and lines is relieved, and protecting the equipment against rapid depreciation.

A further object of this invention is the provision of a safety device, in the nature of shock absorbing means, which will tend to prevent broken lines and parts of well drilling and spudding apparatus, and prevent accident to employees and individuals, as well as preventing breakdowns and loss through delays.

A further object of this invention is the provision of an improved shock absorbing device, for use as an attachment or connecting link between well spudding and operating equipment for wells and the means to operate the same, so as to permit increased efficiency in operation and progress in drilling.

Other objects and advantages of this invention will be apparent during the course of the following detailed description.

In the accompanying drawings, forming a part of this specification, and wherein similar reference characters designate corresponding parts throughout the several views, Figure 1 is a side elevation of the improved connecting link or shock absorbing device.

Figure 2 is a sectional view taken substantially on the line 2—2 of Figure 1.

Figure 3 is a sectional view taken substantially on the line 3—3 of Figure 2.

Figure 4 is a bottom plan view of the shock absorbing device shown in Figure 1.

Figure 5 is a perspective view showing the manner in which the improved shock absorber is connected to the jerk line of a standard rig used for spudding.

Figure 6 is a perspective view showing the type of connection between the improved shock absorber and the pitman of a well drilling walking beam.

Figure 7 is a perspective view showing means for connecting a pulley thereto; the parts of this view being used as shown in Figure 10, with a drilling machine, to permit spudding.

Figure 8 is a side elevation showing the coupling of Figure 5 as used between the improved shock absorber and a jerk line of a standard rig.

Figure 9 shows the shock absorber between the pitman and a drilling machine.

Figure 10 shows a drilling machine used for spudding, with the improved shock absorber interposed as a connecting link.

In the drawings, wherein for the purpose of illustration is shown only a preferred embodiment of the invention, and various ways of adapting it, the letter A may generally designate the improved shock absorbing device, which, as shown in Figure 8, may be connected to the crank arm of a standard drilling rig, as a concrank arm of a standard drilling rig, as a connecting link between the same and a jerk line C; a coupling D being used, as shown in Figures 5 and 8, to connect the same to the jerk line C. As is shown in Figure 9 the improved shock absorber A may be connected to the crank arm of a standard drilling rig B, having a coupling E to connect the same to the pitman F of a walking beam G, for spudding or other well operations. As is shown in Figures 7 and 10, the improved shock absorbing device A may be used with a drilling machine H, having improved means J to operatively connect the crank arm of the machine A in a shock absorbing relation with the cable or flexible line K, for drilling.

Referring to the details illustrated in Figures 1 to 4 of the drawings the improved shock absorbing device A preferably comprises an attaching end plate or block 20, of any approved metal, preferably cast iron or steel, the same being relatively flat and of elongated formation with the end edges convexly rounded. On the top surface the same is provided with an attaching lug 21 having an opening 22 therein. At opposite ends the plate or block 20 is provided with openings 23 for receiving the shanks of guide rods or bolts 26 therethrough, as shown in Figure 3.

The shock absorbing device A furthermore includes an opposite end plate or block 27, of the same general plan shape as the block 20, having openings 28 therethrough for slidably receiving opposite ends of the shanks of the bolts 26, as is shown in Figure 3 of the drawings. The blocks or plates 20 and 27 together with rods or bolts 26 may form a suitable frame.

An intermediate bearing block 30 is provided, the peripheral edges of which conform flush with the peripheral edges of the end blocks 20 and 27, and which is considerably thicker measured longitudinally of the bolts 26 than either of the end blocks or plates 20 and 27. This bearing block 30 is provided with openings 34 therethrough, which slidably receive the shanks of the bolts 26. Transversely across the width thereof, between the openings 34, the block 30 is provided with an opening 37, wherein a brass, bronze, or babbit Bushing 40 is snugly received, such as by shrinking; the bushing 40 having an opening 41 therein for receiving a conventional wrist pin, shown at 44 in Figures 8, 9 and 10 of the drawings, which is connected to the crank arm of well drilling or spudding apparatus.

The blocks or members 27 and 30, at the facing surfaces thereof, are provided with guide projections 45, to serve as seats for spiral springs 46 and 47, which are under compression between the members 27 and 30, and which, of course, are provided as major shock absorbing means tending to force the members 27 and 30 apart. Lock nuts 50 are threaded on the screw threaded ends 51 of the bolts 26, and receiving the plate 27 thereagainst, as a means for detachment of the parts and the bolts 26 from the other parts.

Between the facing surfaces of the top block or member 20 and the wrist pin receiving block 30, is disposed a resilient buffing pad or minor resilient means 55, which may vary in thickness according to the forces which are to be imposed thereon. It conforms in peripheral outline to the periphery of the blocks 20 and 30, and is provided with openings 58 therethrough for receiving the shanks of the bolts 26. By reference to Figure 10, it will be noted that, by the use of a relatively thin resilient pad, the pulley 103 may be kept close to the wrist pin 44 so that when spudding, where the cable K leads from the usual reel adjacent the crank arm 105, there will be proper raising and lowering of the drilling tool even when there is but little of the cable on the reel. This would not be possible if springs like 46 and 47 were interposed between the bearing block 30 and plate 20, instead of the resilient pad 55.

The heads 60 of the bolts 26 abut on the top surface of the top block or member 20, at opposite sides of the attaching lug 21, as shown in Figures 1 and 3 of the drawings.

Figure 8 shows the shock absorbing attachment as linked between a standard rig and the jerk line when spudding. For such a device, the clevis D of Figure 5 of the drawings is used. The jerk line C, has the clevis D connected therewith, in the tapered body 80; the clevis D including the apertured attaching ears 81 and 82, provided with openings 83, which are adapted to align with the opening 22 of the attaching ear or lug 21 of the shock absorbing device A, when said lug 21 is received between the attaching ears 81 and 82, as shown in Figure 5 of the drawings, to receive a pin 85, shown in Figure 8, to pivotally connect the upper block of the device A onto the jerk line C. The wrist pin 44 is of course received in the bushing 40, and said wrist pin 44 is carried by the rotary crank arm 89 of the standard rig B. The spudding operation is obvious.

As shown in Figure 9 of the drawings, the shock absorbing attachment is used upon a drilling machine or standard rig for drilling purposes. When used as a connecting link, the device A under these circumstances has its attaching lug 21 connected at opposite sides with apertured bars or strips 90 and 91, comprising the means E; said strips 90 and 91 having apertures 92 adapted to align with the opening 22 of the attaching lug 21 of the upper block 20, to receive a pin or bolt to make the connection. The attaching bars or strips 90 or 91 are each provided with a longitudinal series of openings 97 therein, which are adapted to selectively receive a connecting pin, by means of which the pitman F may be attached to said bar; the pitman F fitting into the space between the bars 90 and 91, as is shown in Figure 9. The pitman F is of course connected to the walking beam G, and the drilling operation will be apparent to those skilled in the art.

As is shown in Figure 10, the improved shock absorbing device is connected as a coupling link between a drilling machine and the tool supporting cable K, for spudding purposes. When used in this manner, bars 100 and 101 are connected by means of a bolt slipped through apertures 102 of said bars and thru the opening 22 of the top lug 21; the bars 100 and 101 rotatably supporting a peripherally grooved pulley 103 on a pin 104, at the outer ends thereof. The cable K is trained underneath the pulley 103, and the wrist pin 44 of the crank arm 105 of the drilling machine H is of course connected to the bushing 40 in the slide block 30. As the crank arm 105 rotates, the shock on the wrist pin and the other parts of the rig will be buffed.

In connection with the drilling machine B shown in Figure 9. the wrist pin of the device A is of course connected to a rotary crank arm 89, such as is also shown in Figure 8.

However the device is used, the wrist pin 44 rotates through a circle or an arc upon the operating mechanism, and it is pivoted in the bushing 40 of the device A. The block 20 of the device A is coupled in different ways to different parts of the well spudding or drilling line, depending upon the operation. However connected, it is apparent that shock on the wrist pin and other parts of the drilling and operating rig will be lessened, inasmuch as the forces tending to move the block 30 between the end blocks 20 and 27 will be buffed by the resilient pad 55 or the springs 46 and 47, in a manner which is perfectly well apparent from the foregoing description, in connection with the operation of such equipment, as understood by those skilled in the art.

Various changes in the shape, size, and arrangement of parts may be made to the form of invention herein shown and described, and in the adaptation thereof to different types of well drilling and operating equipment, without departing from the spirit of the invention or the scope of the claim.

I claim:

In a connecting link for shock absorbing purposes the combination of an attaching plate, a plurality of guide rods carried by the plate, a bearing slidably guided upon said rods, coil springs carried by the guide rods at the opposite side of the bearing from the attaching plate and acting on the bearing for urging it towards said plate, and a relatively thin resilient pad interposed on the guide rods between the bearing and the attaching plate, closely spacing the bearing and plate.

CARL E. DUFFIELD.